United States Patent
Park

(10) Patent No.: US 6,269,113 B1
(45) Date of Patent: Jul. 31, 2001

(54) MODULATED SIGNAL GENERATOR FOR W-CDMA CHANNEL IN A WIRELESS LOCAL LOOP SYSTEM

(75) Inventor: Chan-bum Park, Sungnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/401,036

(22) Filed: Sep. 21, 1999

(30) Foreign Application Priority Data

Sep. 21, 1998 (KR) .................................................. 98-39045

(51) Int. Cl.[7] .............................. H04B 1/69; H04J 13/00
(52) U.S. Cl. ........................................... 375/146; 370/335
(58) Field of Search .................................... 375/146, 141; 370/342, 335, 441; 455/426, 422

(56) References Cited

U.S. PATENT DOCUMENTS

| | | | |
|---|---|---|---|
| 5,511,073 | * 4/1996 | Padovani et al. | 370/335 |
| 5,751,705 | * 5/1998 | Sato | 370/335 |
| 5,751,761 | * 5/1998 | Gilhousen | 375/130 |
| 6,097,715 | * 8/2000 | Ichihara | 370/342 |

* cited by examiner

Primary Examiner—Temesghen Ghebretinsae
(74) Attorney, Agent, or Firm—Steve Cha; Klauber & Jackson

(57) ABSTRACT

The present invention relates to a modulated signal generator for testing the working functions of a wideband code division multiple access (CDMA) in a wireless local loop (WLL) system. The generator includes: a first modulator having a pilot channel, a synchronous channel, a paging channel, and at least one first power control and signaling (PCS) channel and one first traffic channel for performing modulation of I and Q signals through one of the channels; a plurality of second device having a plurality of a second PCS channel and second traffic channel for performing modulation of I and Q signals through one of the plurality of the second PCS channel and the second traffic channel; a combining device connected to receive a plurality of output I and Q signals from the first device and the plurality of second device, wherein the combining device combines the plurality of output signals into a combined output I and Q signals; filtering device connected to receive the combined output I and Q signals for filtering the combined output I and Q signals; and, a digital-to-analogue converter coupled to the filtering device for converting the filtered I and Q signals into respective analog I and Q signals.

14 Claims, 4 Drawing Sheets

MODULATED SIGNAL GENERATOR FOR W-CDMA CHANNEL IN A WIRELESS LOCAL LOOP SYSTEM

CLAIM OF PRIORITY

This application makes reference to, incorporates the same herein, and claims all benefits accruing under 35 U.S.C. § 119 arising from an application entitled, MODULATED SIGNAL GENERATOR FOR WIDEBAND CDMA WLL SYSTEM, earlier filed in the Korean Industrial Property Office on Sep. 21, 1998, and there duly assigned Ser. No. 1998-039045.

1. Field of the Invention

The present invention relates to a modulated signal generator for a wideband code division multiple access (CDMA) system used in a wireless local loop (WLL) system. More particularly, the present invention relates to a modulated signal generator for testing the performance of an amplifier and a demodulator in the WLL-CDMA system having a 2.3 GHz wide bandwidth.

2. Description of the Related Art

The CDMA system modulates signals from each user with each user's own intrinsic code, prior to transmission, and then spreads them to each cells. In CDMA system, the same frequencies are used in all cells. In order to retrieve the signals, a reverse spreading of the received signals is performed, and then the despreaded signals are multiplied by the same code used during the transmission. As such, the CDMA is effective in decoding the transmission signals in the presence of high interference along the propagation paths.

In the CDMA system, a channel from a base station (BS) to a radio terminal (RT) is known as a forward link, and a channel from a RT to a BS is known as a reverse link.

In the CDMA system, a channel spacing of 5 MHz is used. A convolutional encoder is used to lower the transmission bit error, and the othogonal codes are assigned to each channel intrinsically for the forward link distinction. However, in wideband CDMA system, a direct sequence spreading is used at a chip rate of 4.096 Mcps (Mega chip per second). Each channel is modulated using the technique known as a binary phase shift keying (BPSK) modulation and a quadrature phase shift keying (QPSK) modulation. Moreover, the channel spacing may be spread at a higher spreading rate.

The wideband CDMA channels are classified into a power control and signaling (PCS) channel and a traffic channel. The PCS channel includes a reverse/forward pilot channel and a signaling channel. The traffic channel includes an access channel, a synchronous channel, a paging channel, and a traffic channel for transmitting the real data traffic.

The modulation channel in the base station includes a pilot channel, a synchronous channel, paging channel, traffic channel, and a PCS channel. Each channel of a base station includes a convolutional encoder, an interleaver, a symbol repeater, a serial-to-parallel converter, a signal band spreader, and a scrambler.

The modulation channel of a radio terminal includes an access channel and a traffic channel. The access channel is consists of an access pilot channel and an access information channel, and the traffic channel is consists of a pilot channel, a PCS channel and a traffic information channel. Each channel includes a convolutional encoder, an interleaver, a symbol repeater, a serial-to-parallel converter, and a signal-band spreader.

The channel structure adopting CDMA technology is disclosed in "CDMA Cellular Mobile Communication and Network Security", Chapter 9,10: Prentice Hall PTR, 1997.

In the modulator of a wideband CDMA system as described in the above, the spectrum/output signal characteristics depends on the spread code patterns and the structure of a modulation-signal generator. When a RF amplifier amplifies the analog signal in a transmitter (BS or RT), the performance of a RF amplifier or decoder depends on the modulation process. Thus, the modulated signals by a wideband CDMA system needs to be examined to evaluate whether the performance of the amplifier/decoder in a wideband CDMA system is working properly.

In the prior CDMA system, in order to test the characteristics of the sidelobe regrowth of a RF amplifier, noise signals were used. Although the noise signals exhibit similar spectrum characteristics to that of the CDMA signals, the bandwidth is limited to test a wide range of bandwidth. Moreover, it is impossible to model the real CDMA signals accurately the noise signals, and further, the noise signals could not be used in testing the performance of a demodulator.

A base station or radio terminal using wideband CDMA technology includes a plurality of channels, and the digital gain, the data transfer rate, and the spread coding technique varies depending on the different standards. Thus, the current testing apparatus could not generate such a wideband CDMA testing signals responsive to different testing conditions in order to properly test the working functions of wideband CDMA system.

SUMMARY OF THE INVENTION

One of the objects of the present invention is to provide a modulated-signal generator to test the working functions of a wireless local loop (WLL) CDMA system.

Another object of the present invention is to provide a modulated signal generator for the WLL CDMA system, which can set a signal resource to be modulated per each channel at a specific data transfer rate, digital gain, reference clock, spread code, and spread operation mode designated by the operator.

Other objects of the present invention may be apparent by reading the following detailed description of the present invention and referencing the attached drawings.

DESCRIPTION OF THE PREFERRED EMBODIMENTS

Figure 1:
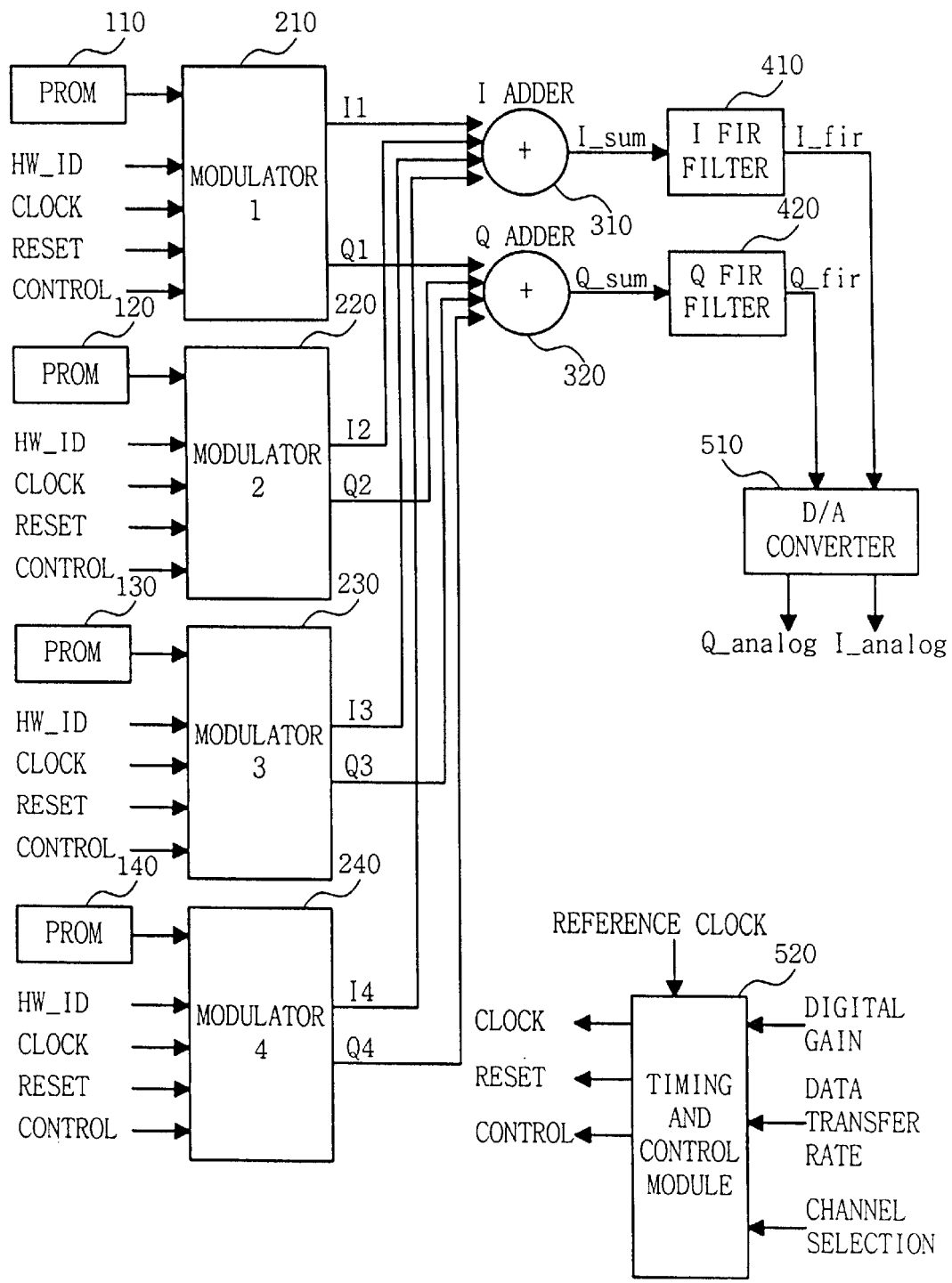
FIG. 1 illustrates a preferred embodiment of a schematic diagram of a modulated signal generator according to the present invention.

A preferred embodiment of a modulated signal generator for producing a plurality of data signals in a wideband code division multiple access (CDMA) system according tot he present invention includes:

a first modulator having a pilot channel, a synchronous channel, a paging channel, and at least one first power control and signaling (PCS) channel and one first traffic channel for performing modulation of I and Q signals through one of the pilot channel, the synchronous channel, the paging channel and at least the first PCS channel and the first traffic channel;

a plurality of second means having a plurality of a second PCS channel and second traffic channel for performing modulation of I and Q signals through one of the plurality of the second PCS channel and the second traffic channel;

combining means connected to receive a plurality of output I and Q signals from the first means and the plurality of second means, wherein the combining means combines the plurality of output signals into a combined output I and Q signals;

filtering means connected to receive the combined output I and Q signals for filtering the combined output I and Q signals; and, a digital-to-analogue converter coupled to the filtering means for converting the filtered I and Q signals into respective analog I and Q signals.

In the embodiment, it is preferable that the generator further includes a timing and control module for providing a digital gain selection signal for setting the digital gain of a channel, a transfer rate selection signal for setting the data transfer rate of a channel, a channel selection signal for selecting the channel operating mode with each of the modulators.

It is preferable that the channel selection signal is used to set each channel of the first and second modulators to one of a power control channel, a signaling channel, a traffic channel, a pilot channel, a synchronous channel and a paging channel.

It is preferable that the timing and control module provides a reference clock to the first and the second modulators.

It is preferable that the generator further comprises a ROM for providing a predetermined data source/signals to be modulated to the first and the second modulators.

It is preferable that the predetermined data source is in an arbitrary PN sequence format.

It is preferable that a predetermined data signals of the storage means comprises a constraint length selection signal for setting a constraint length K; a predetermined PN code seed for generating PN code; an I/Q exchange selection signal; a selection signal for indicating a forward or a reverse channel; and, a plurality of predetermined Hadamard code number.

It is preferable that the channel structure of the first modulator and the plurality of the second modulators include:

a data symbol generator for generating data signals to be modulated in response to a digital gain selection signal, a data transfer rate selection signal, and a channel selection signal;

a convolutional encoder coupled to the output of the data symbol generator for encoding the data signals;

a serial-to-parallel converter coupled to the output of the convolutional encoder for converting the encoded data signals into I and Q signals in parallel;

a symbol repeater coupled to the output of the converter for repeating the converted I and Q signals;

a PN code spreader coupled to the output of the symbol repeater for multiplying the repeated I and Q signals by a PN code to produce a respective spread spectrum I and Q signals; and, a Hadamard code spreader coupled to the output of the PN code spreader for multiplying the PN spread I and Q signals by Hadamard code to produce a respective spread spectrum I and Q signals.

It is preferable that the channel further comprises a ROM for transferring a signal for selecting the constraint length of the convolutional encoder and an I/Q exchange selection signal to the first modulator and the second modulators respectively.

It is preferable that the channel further comprises a ROM for transferring a PN code seed for spreading PN code and a Hadamard code number for spreading Hadamard code to the first and second modulator.

It is preferable that the filter consists of finite impulse response (FIR) filters having a 44-tap coefficient.

It is preferable that the generator operates for using in a base station or for using in a radio terminal according to the user's setting.

A modulated-signal generator according to the present invention uses a CDMA technology. The modulated signals are compared to a set of desirable modulated signals known to an operator in order to determine the performance of a RF amplifier and a demodulator. The modulated-signal generator can generate various types of modulated signals by selectively selecting the data rate, the digital gain of each channel, and the type of spread code. The generator uses a programmable read only memory (PROM) to store a predetermined data source to be modulated, in order to selectively simulate an actual working signals of a radio terminal (RT) or a base station from the ROM data.

The wideband CDMA system spreads the signals by using a pseudo-noise (PN) code and Hadamard code. These signals are modulated using the PN code and the Hadamard code. The election of spread code implemented according to the present invention depends on type of a channel and the operation mode, either a forward or reverse mode, selected by an operator. Accordingly, the modulated-signal generator according to the present invention can selectively elect the type of channel and operation mode as set by an operator.

FIG. 1 illustrates a schematic diagram of the preferred embodiment according to the present invention. As shown in FIG. 1, the signal generator includes a plurality of ROMs (110)(120)(130)(140) for storing the operation parameters of the modulators and the test data source, a plurality of modulators (210)(220)(230)(240) for generating the phase (I) signals and the quadrature (Q) signals in response to a clock signal, a reset signal, and a control signal; an I and Q combiners (310)(320) for adding the four pairs of the I and Q signals generated by each respective modulators; a pair of FIR filters (410)(420) for selecting only the base-band signal from the combined I and Q signals from the I and Q combiners (310) (320); and, a digital-to-analogue converter (510) for converting the filtered I and Q signals from the FIR filters (410) (420) into analog signals. Each of the modulators (210)(220)(230)(240) receives the clock signal, and the reset signal, the control signal from a timing and control module (520).

The timing and control module (520) processes a digital gain selection signal, and a data transfer rate selection signal, a channel selection signal, and a reference clock selection signal, which are inputted by an operator. Then, it generates corresponding a clock signal, a reset signal, and a control signal responsive to the conditions set by the operator. The clock signal generated by the timing and control module (520) in response to the reference clock selection signal from an oscillator is used in each of the modulator, the filters (410) (420), and the D/A converter (510).

Figure 2:
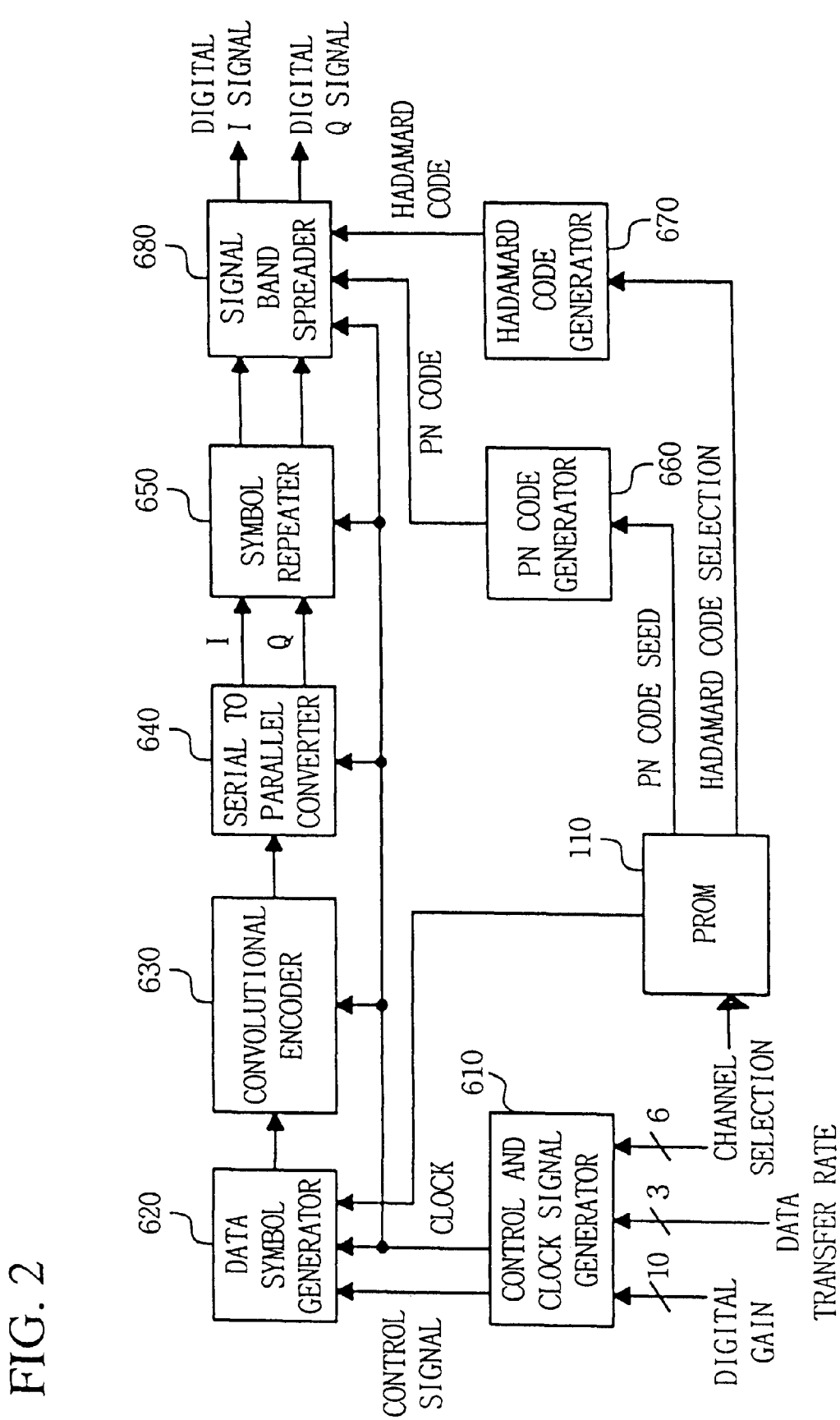
FIG. 2 illustrates a schematic diagram of signaling channel in FIG. 1.

FIG. 2 illustrates a schematic diagram depicting a channel structure according to the modulated-signal generator as shown in FIG. 1. As shown in FIG. 2, the channel comprises a control and clock signal generator (610) for processing the digital gain selection signal, the data transfer rate selection signal, and the channel selection signal from an operator in order to generate a control signal and a clock signal; a data symbol generator (620) for processing the control signal, the clock signal from the control and clock signal generator (610), for retrieving an arbitrary data patterns from a ROM (110) responsive to the generated control signal and clock signal, and for generating data symbols; a convolutional encoder (630) for encoding the data symbols from the data symbol generator (620), a serial-to-parallel converter (640) for converting the encoded signals into I and Q signals; a symbol repeater (650) for repeatedly generating the converted I and Q signals at a predetermined constraint symbol rate; a PN code generator (660) for receiving a PN code selection signal from the ROM (110) to generate a PN code; a Hadamard code generator (670) for receiving a Hadamard code selection signal from the ROM (110) to generate a Hadamard code; and, a signal band spreader (680) for multiplying the repeated signals from the symbol repeater (650) with the PN code and Hadamard code to generate digital I signals and digital Q signals.

As shown in FIG. 2, the digital gain selection signal, the transfer rate selection signal, and the channel selection signal are inputted to the control and clock signal generator (610) directly, and not to the ROM (110). Thus, the modulator can receive the three different selection signals in series from a common ROM, without changing the ROM (110).

The channel structure depicted in FIG. 2 operates as a signaling channel and/or a traffic channel. Since the purpose of the generator is to test the characteristics of the modulated signals, an interleaver and a scrambler are omitted in the description of the present invention.

Figure 3:
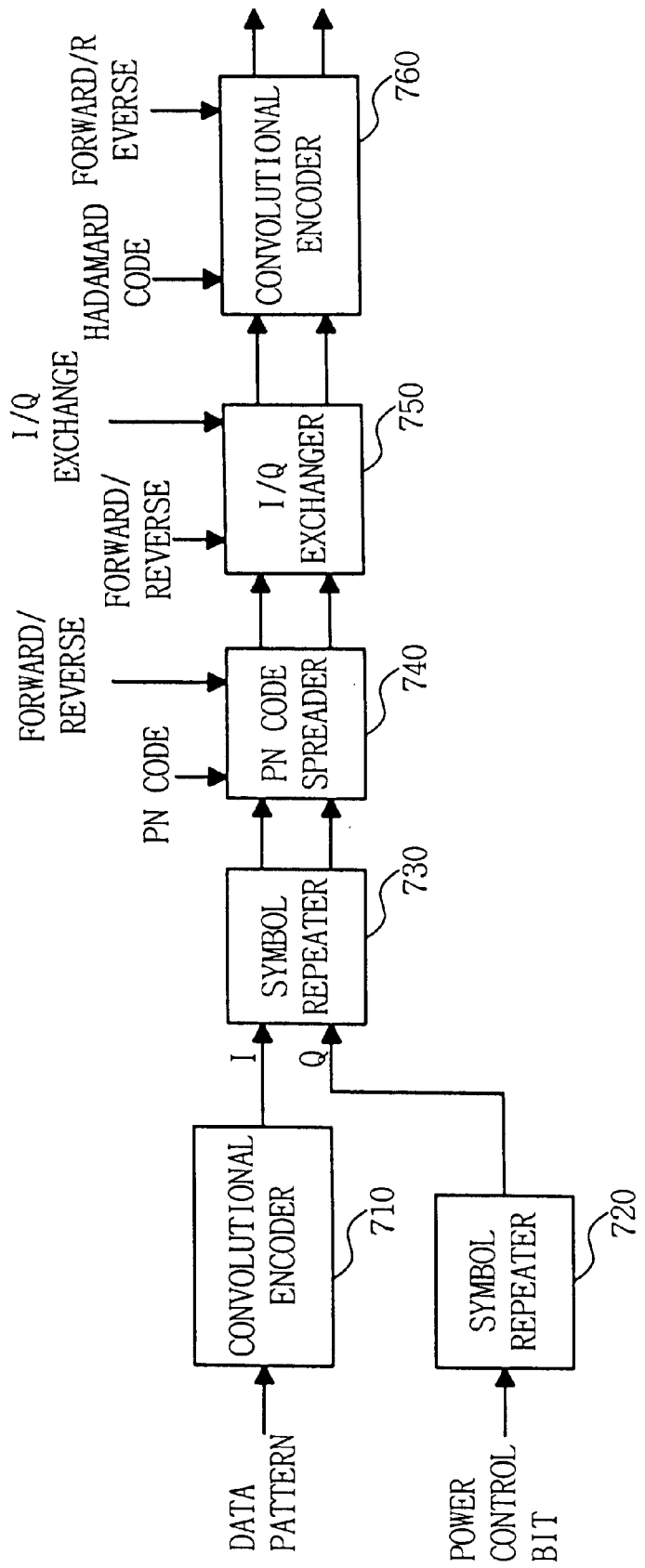
FIG. 3 illustrates a schematic diagram of a power control and signaling channel in FIG. 1.

FIG. 3 illustrates a schematic diagram of modulating a power control and signaling channel or path as shown in FIG. 1. As shown in FIG. 3, the power control and signaling channel includes a convolutional encoder (710) for inputting an arbitrary data pattern from a ROM (110) and encoding them using a constraint length K, which is selected by an operator; a symbol repeater (720) for receiving a power control bit and generating repeated symbols at the same symbol rate as the convolutional encoder output; a symbol repeater (730) for receiving the output signal from the convolutional encoder as I signal and the output signal from the symbol repeater (720) as Q signal for generating the repeated signal; a PN code spreader (740) for receiving the output I and Q signals from the PN code spreader and spreading them using a PN code selected by an operator; an I/Q exchanger (750) for receiving the spread I and Q signals from the PN spreader (740) and exchanging the I signal and the Q signal as occasion demands; and, a Hadamard code spreader (760) for receiving the output signals from I/Q exchanger and spreading them using a Hadamard code selected by an operator.

Figure 4:
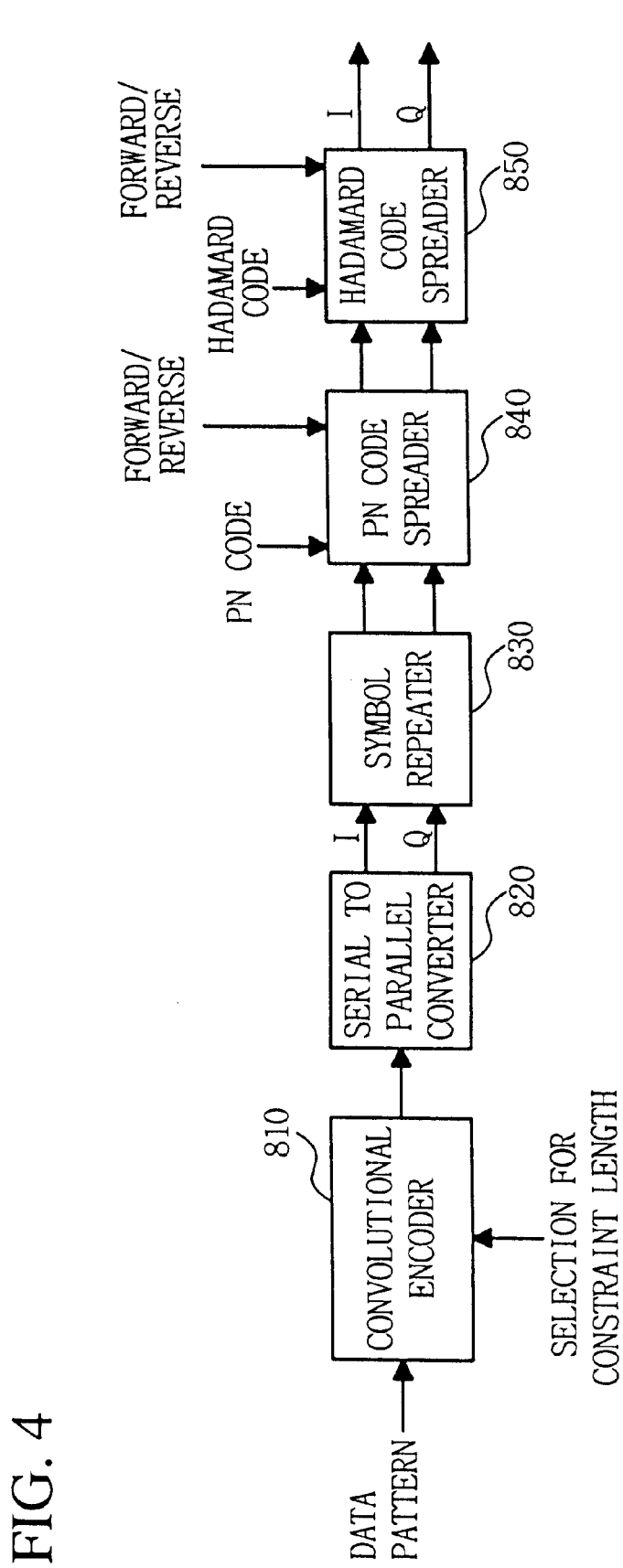
FIG. 4 illustrates a schematic diagram of a traffic channel in FIG. 1.

FIG. 4 illustrates a schematic diagram showing the modulation of a traffic channel or path as shown in FIG. 1. As shown in FIG. 4, the traffic channel structure includes a convolutional encoder (810) for receiving an arbitrary data pattern from a ROM (110) and encoding them using a constraint length K selected by an operator; a serial-to-parallel converter (820) for receiving the encoded signals and generating an I signal and a Q signal; a symbol repeater (830) for generating the I and Q signal at a desired symbol rate; a PN code spreader (840) for spreading the output signals of the symbol repeater using a PN code selected by an operator; and, a Hadamard code spreader (850) for spreading the output I and Q signals from the PN code spreader (840) using a Hadamard code selected by the operator.

According to the present invention, each modulator, except the modulator 1, includes four power control and signaling (PCS) channels and four traffic channels. The PCS channel and the traffic channel operate in a pair, and as such, each modulator is composed of four pairs of channel.

However, the modulator 1 is provided with a first pair of channel as a pilot channel and a synchronous channel, and a second pair of channel as a paging channel. The third pair of channel and the fourth pair of channel of the Modulator 1 are set as a PCS channel and a traffic channel, respectively.

With respect each of the remainder modulator 2 through 4, each pair of channel is set as a power control and signaling channel and a traffic channel. Therefore, the modulated signal generator according to the present invention can generate a pilot channel signal, a synchronous channel signal, a paging channel signal and a total of 14 pairs of PCS channel and traffic channel.

The selection of channel or path to be modulated by a specific modulator is determined by a channel selection signal. As shown in the table 1, the fourth or fifth bit of the channel selection signal represents which type of the modulator is to be selected. The 6-bit channel selection signal has the following meaning.

TABLE 1

| Channel selection signal (5:4) | Meaning of the signal |
| --- | --- |
| 00 | Modulator 1 |
| 01 | Modulator 2 |
| 10 | Modulator 3 |
| 11 | Modulator 4 |

The second or third bit of the channel selection signal represents which pair of channel is to be selected for the modulation, as shown in table 2.

TABLE 2

| Channel selection signal (3:2) | Meaning of the signal |
| --- | --- |
| 00 | A first pair of channel |
| 01 | A second pair of channel |
| 10 | A third pair of channel |
| 11 | A fourth pair of channel |

Unlike other modulators, in the modulator 1, the second and third bits 00 of the channel selection signal represents a pilot channel and a synchronous channel, and the paging channel is assigned to the second pair of channel.

The $0^{th}$ and first bit of the channel selection signal represents the operation mode of a selected channel, as shown in table 3.

TABLE 3

| Channel selection signal (1:0) | Meaning of the signal |
| --- | --- |
| 00 | Not used |
| 01 | Power control |
| 10 | Signaling |
| 11 | Traffic |

Unlike other modulators, in the modulator 1, the $0^{th}$ and first bits of 10 represents a pilot channel, 01 means a synchronous channel, 11 means a paging As an illustrative example, if a binary notation of channel selection signal is 000001, it represents that the first pair of channel of the modulator 1 is to be set as pilot channel.

The data transfer rate of a modulator is determined by a transfer rate selection signal according to the present invention. The 3-bit transfer rate selection signal has the meaning as shown in table 4.

TABLE 4

| bits (2:0) | Data transfer rate |
|---|---|
| 000 | >8 kbps |
| 001 | 16 kbps |
| 010 | 32 kbps |
| 011 | Not used |
| 100 | 64 kbps |
| 101 | 128 kbps |
| 110 | Not used |
| 111 | Not used |

Moreover, each channel of a modulator can select the signal generation mode according to the digital gain. The 10-bit digital gain selection signal can set a digital gain ranging from 0 to 1024.

furthermore, each modulator recognizes its own identity from a binary ID(HW_ID) notation. That is, the hardware ID notation is used to set up the identity of each modulator. The meaning of the 2-bit hardware ID is shown in table 5.

TABLE 5

| Hardware ID (5:4) | Meaning |
|---|---|
| 00 | Modulator 1 |
| 01 | Modulator 2 |
| 10 | Modulator 3 |
| 11 | Modulator 4 |

If a channel were to set up for modulation, each modulator operates according to the parameters stored in a ROM (110). The ROM (110) stores the following operation parameter: a constraint length selection signal which is inputted to the respective convolutional encoder (710)(810) for setting a constraint length K; a PN code seed for generating PN code to be inputted to the respective PN code spreader (740)(840); an I/Q exchange selection signal to be inputted to the I/Q exchanger (750); a forward/reverse selection signal for determining the operation of the code spreader and the I/Q exchanger; and, a Hadamard code number to be inputted to the Hadamard code spreader (760)(850).

If the constraint length selection signal inputted to the convolutional encoder (710)(810) is 0, then the constraint length K is 9. If the selection signal is 1, then the constraint length K is 7. There are two different PN code seeds. One is PN I seed for spreading I signal, the other is the PN Q seed for spreading Q signal. An example of the forward PN I seed is as follows:

"000000000000000000000000000000001"

An example of the forward PN Q seed is as follows:

"000000000000000000000000000000001"

If the I/Q exchange selection signal inputted to the I/Q exchanger (750) is 0, then the exchange is not performed. The I and Q signals are exchanged each other if the value of I/Q exchanger selection signal is 1. If the forward/reverse selection signal is 0, it denotes a reverse selection signal indicating a modulation signal for the radio terminal. If the selection is 1, it denotes a forward selection signal indicating a modulation for the base station.

The Hadamard code inputted to the Hadamard code spreader (760)(850) is determined by the fourth and fifth bits of the channel selection signal. Table 6 shows a Hadamard code of a forward channel, which is set up according to the channel selection signal.

TABLE 6

| Modulators | A first pair of channel | | A sixth pair of channel | | A fifth pair of channel | | A fourth pair of channel | |
|---|---|---|---|---|---|---|---|---|
| Modulator 1 | H0 | H1 | X | H6 | H7 | H8 | H | H |
| Modulator 2 | H10 | H11 | H12 | H13 | H14 | H15 | H16 | H17 |
| Modulator 3 | H18 | H19 | H20 | H21 | H22 | H23 | H24 | H25 |
| Modulator 4 | H26 | H27 | H28 | H29 | H30 | H31 | H32 | H33 |

As shown in FIGS. 3 and 4, if a modulator receives the parameters for operation as shown in the table 6, the modulator receives the corresponding arbitrary data patterns stored in a ROM. The third to fifth bits of the channel selection number are used to select the arbitrary data patterns.

If the format of data pattern is in PN sequence, the efficiency of a RF amplifier and a demodulator can be more accurately determined, by comparing the modulated signals according to the present invention to a set of desirable modulated signals known by the operator. If there is a difference as a result of comparison, the operator can know that there are some errors in a RF amplifier and demodulator. Thus, the data pattern inputted to each channel of the modulator is determined by the PN sequence, which is generated by the PN seed and is selected according to each channel selection number.

In the modulator 1, the pilot channel receives a data pattern of all 0 values from the ROM, and the synchronous channel and the paging channel receive a frame of data pattern having 20 ms length from a ROM. The parameter and corresponding data pattern can be changed by replacing the ROM.

As shown in FIGS. 3 and 4, the data generated from a ROM is convolutional encoded and converted by the serial-to-parallel converter, and passes through the symbol repeater as I and Q signals. The symbol repeated I signal and Q signal are spread by the PN code and the Hadamard code, which are selected by the channel selection signal.

Each modulator adds the 11-bit I signal and the 11-bit Q signal outputted from the four channels, respectively, and outputs the 13-bit I signal (I1,I2,I3,I4) and the 13-bit Q signal (Q1, Q2, Q3, Q4).

The I adder (310) adds the 13-bit I signals (I1,I2,I3,I4) outputted from each modulator (210)(220)(230)(240), and outputs an added 15-bit I signal (I_sum). The Q adder (320) adds the 13-bit Q signals (Q1, Q2, Q3, Q4) outputted from each modulator (210)(220)(230)(240) and outputs an added 15-bit Q signal (Q_sum).

A pair of filter (410) (420) filters the 15-bit I and Q signals. The I filter (410) filters the added I_sum signal and the Q filter (420) filters the added Q_sum signal. At this time, the filter outputs the filtered signals as 16-bit or 20-bit signals responsive to the input range of the D/A converter. The filter consists of finite impulse response (FIR) filters having a 44-tap coefficient. The D/A converter (510) converts the filtered I signal (I_fir) and the filtered Q signal (Q_fir) into the analog I signal (I_analog) and the analog Q signal (Q_analog), respectively.

In the present invention, the expected effects are as follows. The generator generates the modulated signals based on the CDMA technology and can be used in testing the performance of the RF amplifier and demodulator.

The modulated signal generator can select the data transfer rate, each channel's digital gain, PN code seed and Hadamard code. Thus, the generator can generate a variety of modulated signals, and also generate signals simulating either the BS or RT by replacing the PROM data accordingly. Then, the modulated signals are compared to a set of correct modulated signals expected by the operator, and if there is difference among them the operator can determined an error in the RF amplifier and the demodulator based on the comparison value.

Moreover, it is noted that other embodiments having different number of pairs of channel can be implemented. Thus, the present invention can accommodate to generate signals to accommodate different number of traffic channels.

The present invention may be embodied in other specific forms without departing from the spirit or essential characteristics thereof. The present invention is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A modulated signal generator for producing a plurality of data signals in a wideband code division multiple access (CDMA) system, comprising:
   a first modulator having a pilot channel, a synchronous channel, a paging channel, and at least one first power control and signaling (PCS) channel and one first traffic channel for performing modulation of I and Q signals through one of said channels;
   a plurality of second modulators having a plurality of a second PCS channel and second traffic channel for performing modulation of I and Q signals through one of said plurality of said second PCS channel and said second traffic channel;
   combining means connected to receive a plurality of output I and Q signals from said first modulator and said plurality of second modulators, wherein said combining means combines said plurality of output signals into a combined output I and Q signals;
   filtering means connected to receive said combined output I and Q signals for filtering said combined output I and Q signals; and
   a digital-to-analogue converter coupled to said filtering means for converting said filtered I and Q signals into respective analog I and Q signals.

2. The generator as set forth in claim 1, wherein said generator further comprises a timing and control module for generating a clock signal, a reset signal, and a control signal in response to a digital gain selection signal, a data transfer rate selection signal, and a channel selection signal.

3. The generator as set forth in claim 2, wherein said digital gain selection signal sets a digital gain of one of said channels to be modulated by said first modulator and said plurality of second modulators.

4. The generator as set forth in claim 2, wherein said transfer rate selection signal sets a data transfer rate of one of said channels to be modulated by said first modulator and said plurality of second modulators.

5. The generator as set forth in claim 2, wherein said channel selection signal selects one of said channels to be modulated by said first modulator and said plurality of second modulators.

6. The generator as set forth in claim 2, wherein said timing and control module provides a reference clock signal to said first modulator and said plurality of second modulators.

7. The generator as set forth in claim 1, wherein said generator further comprises a storage means for storing a predetermined data signals to be modulated by said first modulator and said plurality of second modulators in response to a channel selection signal.

8. The generator as set forth in claim 7, wherein said predetermined data signals is provided in a format of an arbitrary PN sequence.

9. The generator as set forth in claim 8, wherein said predetermined data signals of said storage means comprises a constraint length selection signal for setting a constraint length K; a predetermined PN code seed for generating PN code; an I/Q exchange selection signal; a selection signal for indicating a forward or a reverse channel; and, a plurality of predetermined Hadamard code number.

10. The generator as set forth in claim 1, wherein said first modulator and said plurality of second modulators comprises:
   a data symbol generator for generating data signals to be modulated in response to a digital gain selection signal, a data transfer rate selection signal, and a channel selection signal;
   a convolutional encoder coupled to the output of said data symbol generator for encoding said data signals;
   a serial-to-parallel converter coupled to the output of said convolutional encoder for converting said encoded data signals into I and Q signals in parallel;
   a symbol repeater coupled to the output of said converter for repeating said converted I and Q signals;
   a PN code spreader coupled to the output of said symbol repeater for multiplying said repeated I and Q signals by a PN code to produce a respective spread spectrum I and Q signals; and
   a Hadamard code spreader coupled to the output of said PN code spreader for multiplying the PN spread I and Q signals by Hadamard code to produce a respective spread spectrum I and Q signals.

11. The generator as set forth in claim 10, wherein said first modulator and said plurality of second modulators further comprises a storage means for storing a constraint length selection signal to be transferred to said convolutional encoder and an I/Q exchange selection signal to be transferred to said first modulator and said plurality of second modulators.

12. The generator as set forth in claim 11, wherein said storage means further comprises a PN code seed for spreading PN code and a Hadamard code number for spreading Hadamard code to said first modulator and said plurality of second modulators.

13. The generator as set forth in claim 1, wherein said filtering means consists of finite impulse response (FIR) filters having a 44-tap coefficient.

14. The generator as set forth in claim 1, wherein said generator can be operated as one of a base station and a radio terminal as set by an operator.

* * * * *